May 6, 1952 H. R. ZINN 2,595,746
SUPPORT FOR DISASSEMBLED SECTIONS OF FLY AND SIMILAR RODS
Filed Oct. 29, 1947 2 SHEETS—SHEET 1
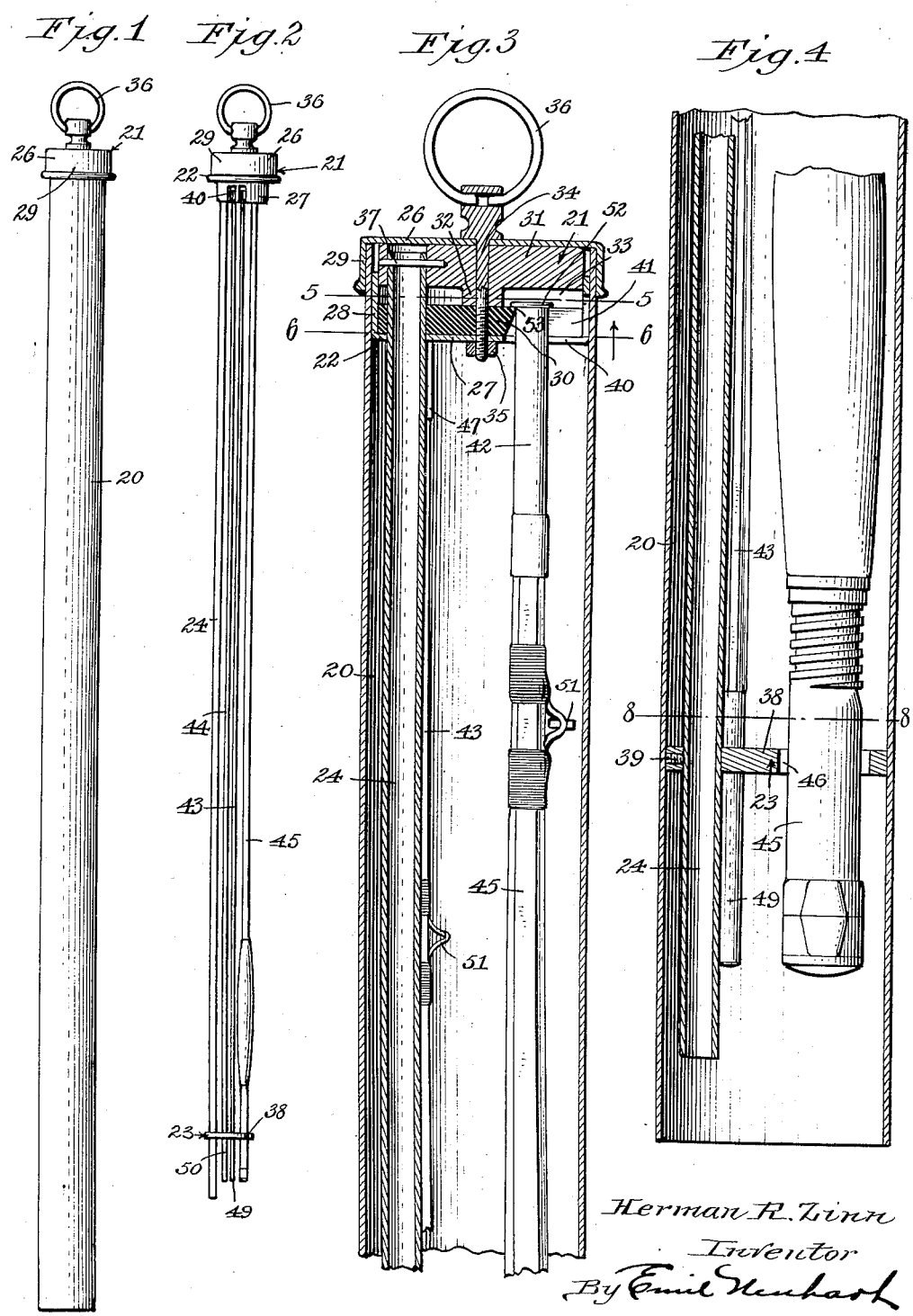
Herman R. Zinn
Inventor
By Emil Neuhart
Attorney.

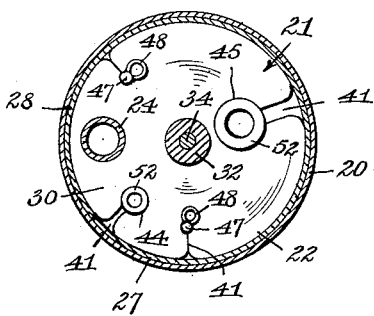
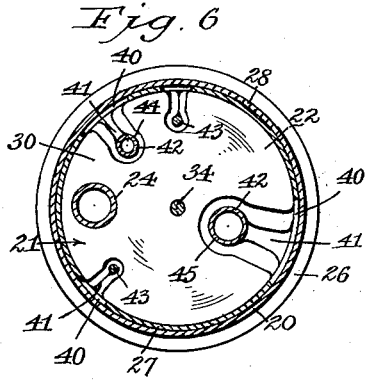
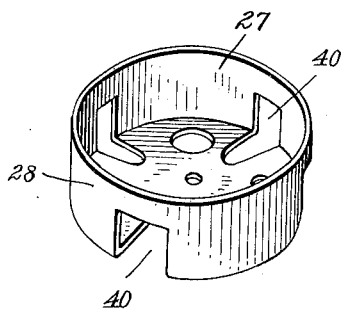
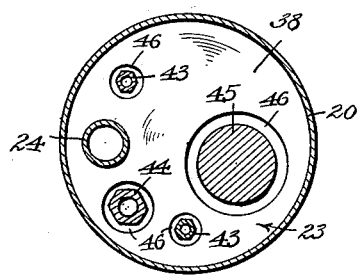
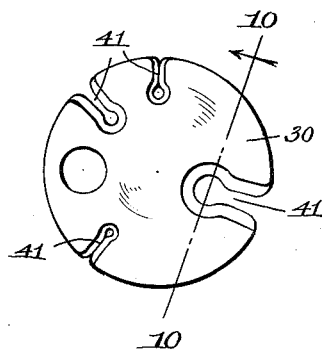
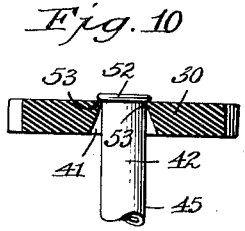

Patented May 6, 1952

2,595,746

UNITED STATES PATENT OFFICE 2,595,746

SUPPORT FOR DISASSEMBLED SECTIONS OF FLY AND SIMILAR RODS

Herman R. Zinn, Rochelle Park, N. J.

Application October 29, 1947, Serial No. 782,739

4 Claims. (Cl. 211—68)

My invention relates to supports for disassembled sections of fly and similar rods, and more particularly to rods of this type made of bamboo.

Fly rods invariably are constructed of sections connected together to provide a flexible full length rod, and invariably the sections are light in weight, being constructed of a few ounces of slender strips of wood or fiber assembled and glued together, and therefor being incapable of withstanding abuse or neglect if desired, to retain the sections normally in straight-lined condition so that when they are assembled by connecting them together, the entire rod has the axes of its sections coincident and perfectly straightlined unless under strain of the type encountered when subjected to force, such as applied to the rod when throwing the fish line out across the water or by a fish caught and struggling to free itself from the line cast under manipulation of the rod.

As is well known by fishermen, moisture and heat are injurious to bamboo and other wooden or fiber rods, and as it is common to store the sections of a rod in aluminum or other cases designed to protect them in transit, they are invariably placed under strain or stress laterally, especially when the case is carried in an inclined position, or when in an upright position with the sections resting on one of their ends. Strains of a different nature are applied to the sections of the rod when the case is laid on its side, due to the fact that the sections do not have proper support along their entire lengths.

Rods which have become moistened, as often occurs after a fishing expedition or trip will, when left in the case and the case is placed in the hot sun, become warped and this tendency is augmented and the effects thereof expedited when the case is carried in an automobile, because of the intense heat generated through the glass of the automobile windows and carried to the rod sections through the case.

Many fishermen carry their rods in a bag which oftentimes becomes damp while on a fishing trip, particularly when the rod sections are retained in the bag after return from the trip, with the result that sweating of the rod sections takes place, causing the varnish to be ruined and occasionally even the glue holding the slender wood, bamboo or other fiber portions of the rod sections together to become softened. Rod sections carried in bags are subjected to other strains and stresses and because of bags being flexible, the rod sections are given no protection except to save them from becoming scratched or the finish otherwise damaged. They are also subjected to lateral thrusts or strains which may cause minor troubles or even necessitate repairs. Such strains and stresses may also result in creating loose ferrules, and certain of such effects as result from heat may result in shrinkage of the bamboo or other material used, causing the ferrules to become loosened, especially under action of the component lateral strains applied thereto. When the sections are assembled and the rod whipped, the hook and fly on the line will be directed to a point other than that intended for them.

It is the prime object of my invention to provide a new and novel holder or support for the rod sections that will hold and retain the sections in straight-lined condition and subject them to strain in the direction of their axes only.

It is also the object of my invention to provide such a holder or support which can be carried in an aluminum or other case and which can be suspended in an automobile while traveling or be otherwise held in an upright position while traveling or when at rest at the place selected for the fishing expedition, or while at home, and which holder or support, if desired, may be removed from the case and be suspended in an exposed condition.

It is another object of my invention to provide a holder or support which may be suspended from a nail or other carrying object while storing the same so that the sections of the rod are free to swing and find their own centers of gravity, thereby subjecting each section to internal strain with its axis as its true center, thus guarding against the tendency to warp or buckle.

A still further object of my invention is to provide a holder or support in which the rod sections may be individually secured in a manner that they will assume a vertical position and so that they can be easily and quickly secured to the holder or support or removed therefrom.

With the above and other objects in view to appear hereinafter, my invention consists in a holder or support capable of individually suspending rod sections therefrom so that they are subjected to strain in the direction of their axis only and thus retain them in a symmetrical condition assuring a complete flexible rod when the sections are assembled which can be whipped when casting, with assurance that hook and fly attached to the line cast out from the tip of the rod will reach the point intended for the same and not be deflected to the right or left, due to a warped fly rod.

The invention further consists in the novel features of construction and in the arrangement and combination of parts to be hereinafter described and more particularly pointed out in the subjoined claims.

In the drawings,

Fig. 1 is a side elevation of a case having my improved fly rod holder or support attached to the upper end thereof so as to extend thereinto.

Fig. 2 is a side elevation of the fly rod holder or support removed from the case with the fly rod sections shown suspended therefrom.

Fig. 3 is an enlarged longitudinal section of the upper end of the case and the upper end of the fly rod holder or support placed therein; also showing the upper ends of the fly rod sections suspended therefrom.

Fig. 4 is a longitudinal section of the lower end of the case with the lower end of the fly rod holder or support shown therein and the lower ends of fly rod sections suspended therein.

Fig. 5 is a transverse section taken on line 5—5, Fig. 3.

Fig. 6 is a transverse section taken on line 6—6, Fig. 3, looking in the direction of the arrow crossing said line.

Fig. 7 is a detached perspective view of the cup-like housing forming part of the holder.

Fig. 8 is a transverse section taken on line 8—8, Fig. 4.

Fig. 9 is a bottom plan view of the flexible rod retaining element.

Fig. 10 is a section taken on line 10—10, Fig. 9.

Having reference to the drawings in detail, 20 designates an elongated cylindrical case constructed of aluminum or other suitable material, preferably open at opposite ends and adapted to be closed at its upper end by a part of the support, designated as a whole by the numeral 21. This support comprises an upper member 22 and a lower member 23 connected together by a connecting member 24 in the form of a tube.

The support, and more specifically considered the upper member of the support, includes a cap 26 adapted to fit over the upper open end of the case, and a housing 27 which is of cup-like formation and connected to said cap in spaced relation thereto. The peripheral wall 28 of said housing is separated from the annular depending flange 29 of the cap by a space occupied by the upper end portion of the peripheral wall of the case, as clearly shown in Fig. 3.

Fitted into the cup-like housing 27 is a flat gripping member 30 formed of yieldable material, for example rubber, between which and the flat top member of the cap 26 a spacing member 31 is arranged, said spacing member having an axial depending boss 32 which lies in contact with the central region of the yieldable gripping member but is otherwise separated from the upper surface of said gripping member by an annular intervening space 33.

Passed axially through the cap 26, the spacing member 31, the gripping member 30 and the bottom of the cup-like housing 27 is a headed securing screw 34. This screw is therefore passed through the parts constituting the upper member of the rod supporting device, the head of the screw abutting against the upper surface of the cap 26 and a nut 35 being applied to the lower end of said screw, thus connecting together all parts of the upper member, which is formed to enter the upper end of the case 20 and to surround the same. The head of the securing screw 34 has a ring 36 secured thereto so that the rod supporting device, with or without the case 20, may be suspended from a nail or other carrying object with the view of having all parts assuming perfectly vertical positions.

As clearly shown in Fig. 3, the spacing member 31 snugly fits within the upper portion of the cup-like housing 27, and the latter snugly fits within the upper end of the case. Thus, with the flange of the cap 26 surrounding the upper extremity of the case, the said upper member of said support is firmly attached to the case and the latter retained around the supporting member and the rod sections, to be hereinafter described, while suspending the whole device by means of the ring 36.

The tube 24 is passed through registering openings formed at one side of the axis of the upper member, the openings being formed in the cup-like housing 27, the gripping member 30 and the spacing member 31, it being secured within the spacing member by means of a pin 37 or otherwise. This tube, therefore, extends downwardly from the spacing member 31 through the intervening space 33 and through the gripping member 30 and the bottom of the housing 27 and terminates at its lower end near the lower end of the case 20.

Secured to this tube, near its lower end so as to be rotatably adjustable thereon, is the lower member 23 which may be termed a centering element in the form of a disk 38 fastened in desired position by means of a set screw 39. This disk is, therefore, movable with the tube 25, and its axis is normally coincident with the axis of the upper member. This disk is of a diameter to snugly fit within the case 20 and thus position the connector tube 24 in true vertical position.

The peripheral and bottom walls of the cup-like housing 27 are provided with openings 40, said openings being directed from the angle of said walls both upwardly in the peripheral wall and inwardly in said bottom wall, and these vary in size, for a purpose to appear hereinafter.

The gripping member 30 has radially alined with the openings 40, notches 41 which vary in width and the walls of which notches are yielding under pressure, the inner ends of said notches being circular or parti-circular to receive the cylindrical ferrules 42 at the upper ends of the several fly rod sections, designated 43, 44 and 45, respectively, and the outer ends thereof being flared outwardly to facilitate the introduction of the upper ends of the fly rod sections thereto. It may be noted that the openings 40 in the cup-like housing are somewhat wider than the outwardly flared entrance ends of the notches 41 so that the upper ends of the rod sections may be passed therethrough and have easy entrance into the notches 41.

Formed in the lower member of the support, more particularly referred to as the centering element or disk 38, are openings 46, the axes of which are coincident with the circular or parti-circular inner ends of the notches 41. Fly or other rods or poles of the type which this device is designed to support, invariably comprise three sections, such as the sections 43, 44 and 45, and by reason of the fact that the tip sections 43 become more readily damaged than the remaining sections of the rod, due to their slenderness, a complete set of sections invariably includes two tip sections, and therefore in this device provision is made to support an additional tip section for emergency purposes. Each tip section has a cylindrical ferrule 47 at its upper end and an eye 48 extending upwardly and laterally therefrom through which the fish line (not shown but understood to extend along the rod) is passed.

At the lower end of the tip section 43, a male ferrule 49 is arranged which is designed to enter the female ferrule 42 at the upper end of the intermediate rod section 44. A male ferrule 50 is secured to the lower end of the intermediate section 44 and it is designed to enter the female ferrule 42 at the upper end of the lower or handle section 45 of the rod. The several sections are provided with laterally extending eyes or loops 51 along their lengths, through which the fish line is passed in the usual way, the line being provided at its outer end with a fishhook and fly, (not shown) while a reel (not shown) is removably secured to the handle section in any approved manner, the line being wound around said reel and played out as required during the act of casting.

By reason of the case 20 being cylindrical, the cup-like housing 27 is similarly formed and the gripping member 30 is consequently of circular formation so that it will fit within the cup-like housing. The notches 41 in said gripping member have their walls flared downwardly so as to form a sharp angle between the upper surface of the said gripping member and said downwardly-flared walls, against which the eye 48 of each tip member and the annular beads 52 formed on the female ferrules 42 are supported. This, therefore, establishes line-contacts 53 for the several sections of the fly rod and thus permits said rod to sway laterally in any direction so as to allow each section to assume a true vertical position under suspension in which the lower ends thereof hang centrally within the openings 46 formed in the centering disk or lower member 38 of the complete rod support.

I particularly wish to stress the fact that the gripping member 30 is preferably formed of soft rubber or other readily yielding material and that the notches 41 formed therein have the line-contact portions 53 at opposite walls thereof either held in direct contact with each other or so spaced from each other that when the upper ends of the several sections of the rod are entered thereinto, slight force is required, due to the fact that the diameter of said rod sections at their upper ends are greater than the space between said line-contact portions. Making the gripping member of yielding material has decided advantages, but it will be apparent that the salient features of this invention may be attained even though the gripping member is formed of non-yielding material. The rounded inner ends of the notches are of a diameter approximating that of the ends of the sections which they are to receive so as not to compress the rubber at said inner ends, and thus assure true suspension of the rod sections which are maintained in straight-lined condition due to the absence of any lateral strains or stresses applied thereto. This is particularly true for the reason that the openings 46 in the centering element or lower member of the support 38, while axially alined with the rounded inner ends of the notches 41, are of greater diameter than the portions of the fly rod sections passed therethrough. Thus, if the case should be temporarily laid on its side the rod sections would be held in spaced relation within the case.

In a device constructed as described, the frictional contact of the cap 26 against the outer surface of the case and the frictional contact of the housing 27 against the inner surface of the case exert a gripping effect on the wall of the latter at its upper end and enables the case with the fly rod sections therein to be suspended by the ring 36, with all the advantage benefiting said sections specified.

I have particularly spaced the rod sections so that the heaviest section is substantially opposite the tube 24, and the remaining sections are irregularly spaced circularly so that a balancing suspension of the rod sections is assured, thus guarding against any deflection from true verticality so important in maintaining the rod sections pendant or suspended without leaning laterally in any direction. The rod sections are therefore maintained under stress axially with the lower portions of the rod sections truly centered in the openings 46 in the centering disk or lower member 38 of the support. The device thus far described is preferably maintained as a complete device both in storing the rod sections during out of season periods and for transporting the sections when traveling to and from the location selected for fishing.

Having thus described my invention, what I claim is:

1. In a support for disassembled sections of a fly rod or the like, an elongated case open at its upper end, a cap encircling the upper open end of said case and closing the same, a cup-like member carried by said cap, a gripping member formed of yielding material fitted into said cup-like member, a spacing member between said gripping member and said cap formed to provide an annular intervening space between the two, a centering disk within said case spaced from said cup-like member, a tube extending through said cup-like member, said gripping member and said spacing member and secured to the latter, said tube being secured to said disk and being off center with respect to the axis of said case, said gripping member having notches opening to the periphery thereof and said cup-like member having openings through its bottom and peripheral wall permitting access to said notches, said notches having circular inner ends to receive the sections of the fly rod and suspend the same in a free manner and said centering disk having openings therein axially alined with the circular inner ends of said notches, the lower ends of said rod sections extending freely through the openings in said centering disk to allow said sections to assume true vertical positions, said centering disk being adjustable on said tube to bring the axis thereof in alinement with the axis of said gripping member and to position said openings axially with respect to the axis of the circular inner ends of said notches.

2. A support for disassembled sections of a fly rod or the like, comprising an elongated case open at its upper end, a cap closing the upper open end of said case and having rod-supporting means including a cup-like member provided with openings in its bottom wall extended upwardly through portions of its peripheral wall, a circular gripping member fitted within said cup-like member and having peripheral notches adapted to receive and hold the fly rod sections suspended therefrom, said notches coinciding with the openings in said cup-like member, a tube extending downwardly from said cup-like member and fastened in fixed position with relation thereto, said tube being at one side of the axis of said cup-like member, a disk fastened to said tube in spaced relation to said cup-like member and having openings therein alined with the regions of said notches gripping said sections, the notches in said gripping member and the openings in said disk being of different sizes to receive the different sized sections of said rod and distribute the weight equally around the axes of both said gripping member and said disk, and thus assure axial alinement of said two last-mentioned elements.

3. In a support for disassembled sections of a fly rod or the like, a circular supporting member comprising a cup-like element having a bottom wall and a peripheral wall, a circular gripping member fitted into said cup-like element and formed of yielding material provided with a circular series of notches spaced around the same and adapted to receive rod sections of different weights therein in a manner to suspend said sections freely from said gripping member, said cup-like element having openings therein alined with said notches to permit entering said sections into the latter, means axially applied to said supporting member to suspend the same, a tube arranged off center and depending from said supporting member, a centering disk arranged off center on said tube and spaced from said supporting member, said centering disk being rotatable on said tube and said disk having openings therein through which the lower ends of said rod sections are freely passed, said openings being alined with portions of the notches of said gripping member engaging said sections to suspend the same, the disposition of the notches in said gripping member and the openings in said disk being such that the weight of said sections and said tube are equalized so as to maintain axial relation of said disk with the axis of said supporting member and thus cause said fly rod sections to assume true vertical free hanging positions.

4. A support for disassembled sections of a fly rod, comprising an elongated case adapted to be supported in vertical position and open at opposite ends, a cap closing the upper open end of said case and having rod-supporting means carried thereby including a circular gripping member having peripheral notches adapted to receive and grip the fly rod section suspended therefrom, a tube extending downwardly from said rod-supporting means and fastened on its upper end in fixed position with relation to said cap, said tube being disposed to one side of the axis of said circular gripping member, a disk fastened to the lower portion of said tube and having openings therein alined with the regions of the peripheral notches gripping said sections, the notches in said gripping member and the openings in said disk being of different sizes to receive the different size sections of said rod and distribute the weight equally around the axis of both said gripping member and said disk and thus assure axial alinement of two last-mentioned elements.

HERMAN R. ZINN.

REFERENCES CITED

The following references are of record in the file of this patent:

UNITED STATES PATENTS

| Number | Name | Date |
|---|---|---|
| 69,026 | Richmond | Sept. 17, 1867 |
| 144,539 | Hayes | Nov. 11, 1873 |
| 290,268 | Read | Dec. 18, 1883 |
| 407,560 | Wilson et al. | July 23, 1889 |
| 491,891 | Jones | Feb. 14, 1893 |
| 742,040 | Kurtz | Oct. 20, 1903 |
| 754,971 | Cloherty | Mar. 22, 1904 |
| 1,574,459 | Wilhelm | Feb. 23, 1926 |
| 1,698,377 | Stonebraker | Jan. 8, 1929 |
| 1,958,772 | Stewart | May 15, 1934 |
| 2,280,003 | Pearson | Apr. 14, 1942 |
| 2,287,425 | Fox | June 23, 1942 |
| 2,390,631 | Young | Dec. 11, 1945 |
| 2,429,305 | Barnes | Oct. 21, 1947 |